Nov. 27, 1945.   T. B. FUNK   2,389,972
BRAKE MECHANISM
Filed March 28, 1942   2 Sheets-Sheet 1

Inventor
TRUMAN B. FUNK
By Beaman + Langford
Attorneys

Nov. 27, 1945.   T. B. FUNK   2,389,972
BRAKE MECHANISM
Filed March 28, 1942   2 Sheets-Sheet 2
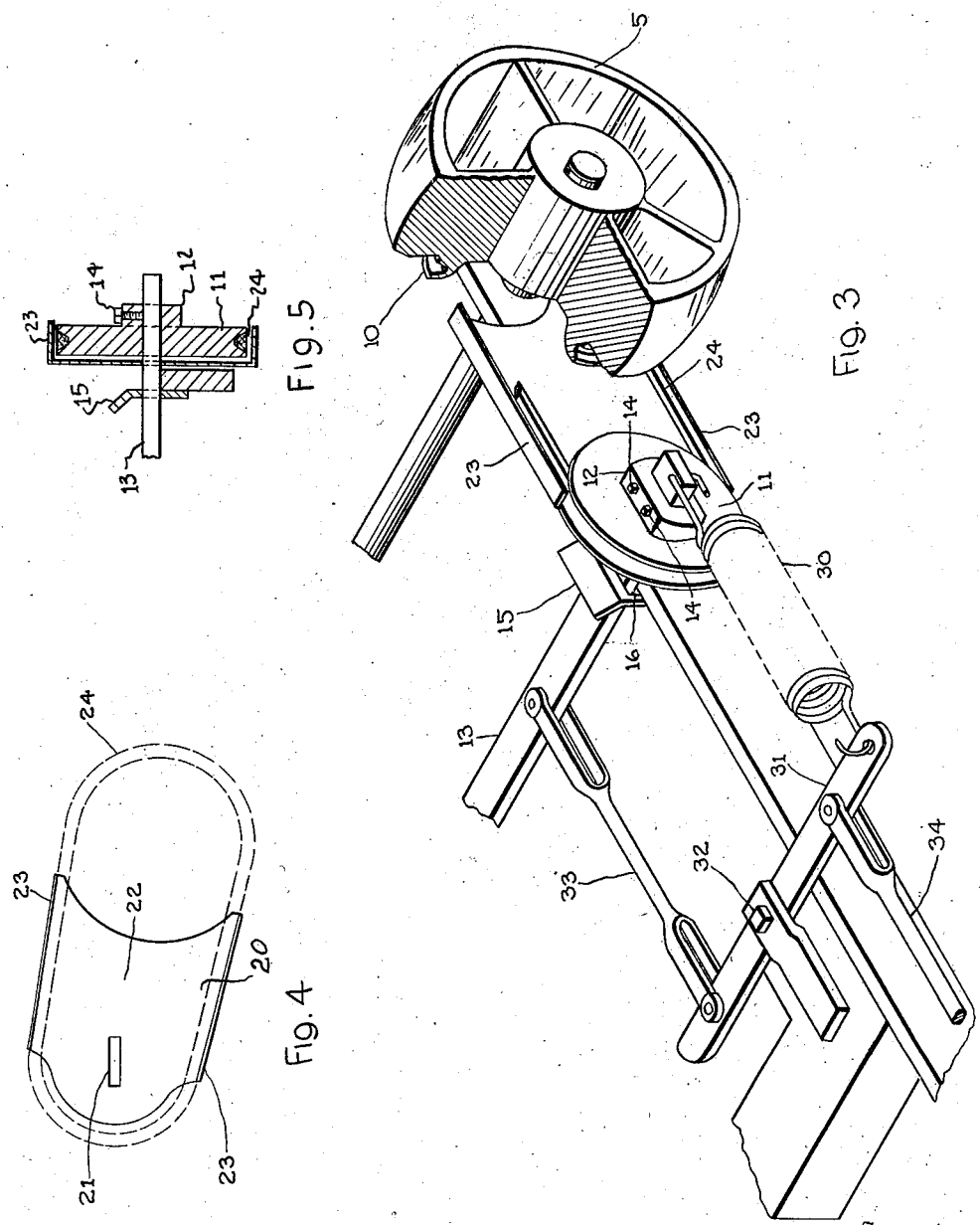
Inventor
TRUMAN B. FUNK
By Beaman & Langford
Attorneys Patented Nov. 27, 1945

2,389,972

UNITED STATES PATENT OFFICE 2,389,972

BRAKE MECHANISM

Truman B. Funk, Jackson, Mich., assignor to Yard-Man, Inc., Jackson, Mich., a corporation of Michigan Application March 28, 1942, Serial No. 436,573

16 Claims. (Cl. 188—2)

The present invention relates to brakes and more particularly to a brake applicable for use on vehicle wheels or on other rotary parts, the brake being particularly characterized by the fact that it occupies an exceedingly small space, gives a maximum amount of clearance and contains a minimum number of parts that can give mechanical trouble.

The brake according to the present invention is shown adapted to a powered truck for inside factory and warehouse use. Specifically, the brake consists of a sheave rotatable with and about the same axis as a ground wheel, and a nonrotatable sheave spaced from this first sheave but in alignment therewith, there being a V belt disposed about the sheaves. The nonrotatable sheave is movable to tension the belt and thus to brake the ground wheel. Associated with the belt is a device to free the belt from the rotatable sheave when in non-braking relation thereto.

An object of the present invention is to provide a light weight, inexpensive brake having a large braking surface, relative to the space taken up by the brake.

Another object of the invention is to provide a brake wherein an endless belt is placed over a sheave, the rotation of which is to be braked, and a nonrotatable sheave, and the belt is tensioned to effect braking.

A further object is to provide a braking belt passing over two sheaves, the belt having a tendency to bow outwardly when slack, with a device to restrain the outward bowing when slack to result in freeing the belt from at least one of the sheaves.

A still further object is to provide a brake having a brake band in the form of an endless belt which is so arranged that wear from braking only takes place over a relatively small length of the belt upon brake application, with the wear being distributed by the creeping action of the belt.

Figure 1:
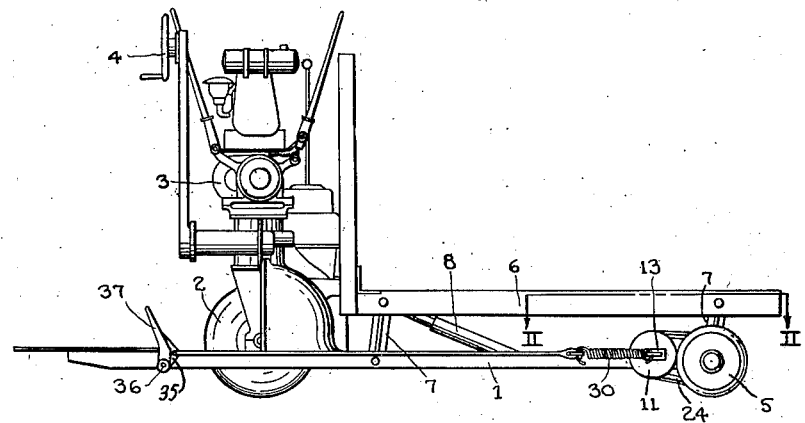
Figure 2:
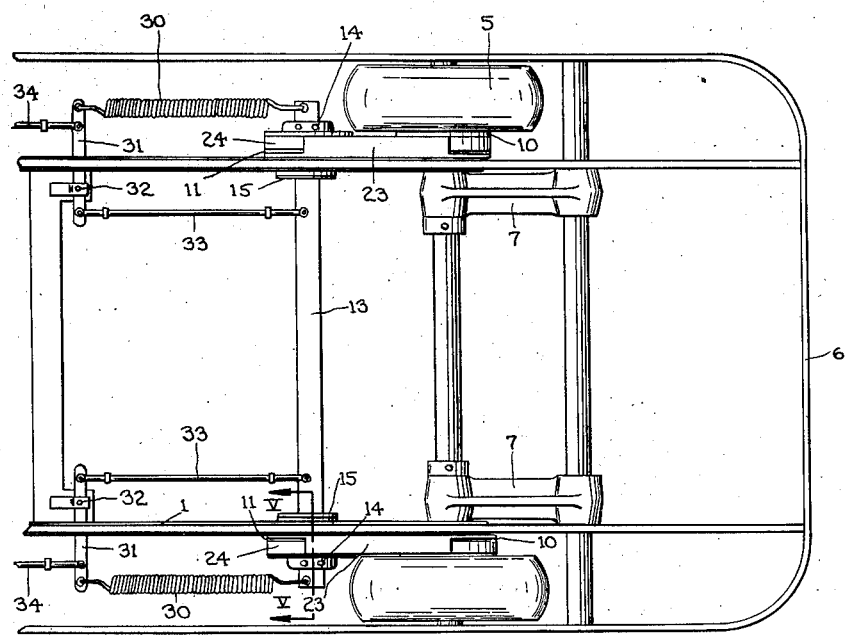

These and other objects residing in the arrangement, combination and construction of the parts will be apparent from the following specification when taken with the accompanying drawings in which Fig. 1 is a side elevation of a motorized factory lift truck on which brakes according to the present invention are used, Fig. 2 is an enlarged section on the line II—II of Fig. 1, Fig. 3 is a perspective view of a part of the truck disclosed in Fig. 1, broken away in part to more fully illustrate the invention, Fig. 4 is a side illustration of the belt controlling shroud, having its relation to the belt shown by dotted outline, and Fig. 5 is a vertical section through the nonrotatable sheave, illustrating its relation to the vehicle frame and its support.

Referring particularly to the drawings, the reference character 1 illustrates the frame of a motorized lift truck having a driving wheel 2 driven by a suitable internal combustion engine 3 through suitable connections not shown. The driving wheel 2, which may be constituted as a pair of adjacent wheels, is steerable by a suitable control 4. At the opposite end of the truck from the driving wheel 2 are a pair of spaced, freely rotating wheels 5. A platform 6 is supported from the frame 1 by suitable links 7 and the platform 6 may be swung upwardly by a suitable hydraulic lift 8.

The structure thus far described constitutes a separate invention not claimed herein. The disclosed embodiment of the present invention relates to the brakes for the truck disclosed, the brakes being associated with the free wheels 5.

Associated with each free wheel 5 is a sheave 10 arranged for rotation therewith. Arranged in alignment with each rotatable sheave 10 is a nonrotatable sheave 11. Each nonrotatable sheave 11 is provided with a hub 12 through which extends a bar 13, extending across the frame 1 of the truck, each sheave 11 being secured to the bar 13 by set screws 14. The bar 13 rests on the top of the frame 1 as shown particularly in Fig. 3, and movement with respect to the frame 1 is restrained by plates 15, there being a plate 15 on each side of the frame 1. Each plate 15 is provided with a rectangular opening 16 through which the bar 13 extends. As will be particularly clear from Fig. 3, the bar 13 is of less width than the length of the slots 16 so that the bar 13 may move sideways in the slots 16.

Clamped between each sheave 11 and the adjacent portion of the frame 1 is a shroud 20, shown most clearly in Figs. 3 and 4. Each shroud 20 is provided with an elongated slot 21 through which the bar 13 snugly fits so that each shroud 20 is securely supported with respect to the bar 13 and frame 1 but at the same time may be moved with the bar 13 with respect to the frame 1 as will be hereinafter described. Each shroud 20 consists of a side plate 22 in which its slot 21 is disposed, and of belt controlling members 23. The belt controlling members 23 are at right angles to the plates 22, respectively, and are preferably arranged to just clear the belts 24 which are disposed around each pair of sheaves 10 and 11 when the belts 24 are tight.

The belts 24 are preferably of V cross section and the grooves in the sheaves 10 and 11 are of complementary V cross section so that when the belts 24 are tightened the grooves in the sheaves 10 and 11 grip the belts 24, with the result that rotation of the wheels 5 is braked. The belts 24 are tightened by tension springs 30. One end of each tension spring 30 is connected to one of the outer ends of the bar 13 and the opposite ends of the springs 30 are connected, respectively, to bars 31. The grooves in the sheaves 10 and 11 constitute brake band portions. The bars 31 are shown particularly in Fig. 2 and are pivoted to a portion of the frame 1 by pins 32. The inner ends of the bars 31 are connected by links 33 to portions of the bar 13 inwardly from the sheaves 11 thereon. Each bar 31 has connected thereto, between its point of connection with the spring 30 and its pivot 32, a link 34. The opposite ends of the links 34 are connected to cranks 35 on a shaft 36, the shaft 36 being adjacent the rear of the frame 1. The shaft 36 is provided with a foot pedal 37. The foot pedal 37 is normally raised as shown in Fig. 1 due to the action of the springs 30.

The operation of my invention is as follows: The action of the springs 30 draws the bars 13 toward the rear of the frame 1 to tension the belts 24 and thus apply the brakes by urging the belts 24 into frictional engagement with the sheaves 10 and 11. The fact that the sheaves 11 are nonrotatable and also frictionally engage the belts 24 results in the belts 24 restraining the rotation of the sheaves 10. Since the sheaves 10 are rotatable with the wheels 5, the action is to brake the rotation of the wheels 5.

When it is desired to release the brakes, foot pressure is applied to the foot pedal 37 to rock the shaft 36 in a counter-clockwise direction as viewed in Fig. 1. This movement of the shaft 36 draws the links 34 rearwardly with the result that the bars 31 are pivoted about their respective pins 32 to place the links 33 under compression. The links 33 under compression force the bar 13 toward the front of the frame 1, that is toward the wheels 5. The forward movement of the bar 13 is permitted by the fact that the slots 16 through which the bar 13 extends are longer than the width of the bar 13. The forward movement of the bar 13 releases the tension in the belts 24.

The belts 24 are of a conventional relatively stiff V belt construction and have the characteristic that when they are slack, the portions between the sheaves 10 and 11 bulge outwardly, that is, the elongated loop formed by the belt when tensioned upon the sheaves 10 and 11 tends to become more circular upon slackening. This outward bulging is restrained by the controlling members 23 on the shrouds 20, with the result that the slackening of the belts 24 causes the belts 24 to move away from the sheaves 10 and 11. Thus, in order to insure that the belts 24 when slack are free from at least one of the sheaves 10 and 11, the shrouds 20 are provided.

As explained hereinabove, when the bars 13 move, the shrouds 20 move with them. As the shrouds 20 move forwardly with the bars 13, they urge the belts 24 forwardly with the result that the belts 24 are moved away from the sheaves 10. The action of the shrouds 20 may restrain movement of the belts 24 away from the sheaves 11. However, this action is unimportant since the sheaves 11 are not rotatable. Furthermore, it is most desirable to have the belts 24, when slack, away from the rotatable sheaves 10, as will be obvious.

It will be observed that the nonrotatable sheaves 11 are of smaller diameter than the rotatable sheaves 10. Thus, as will be apparent from Fig. 4, as the shrouds 20 are moved toward the sheaves 10, there will be a tendency of the controlling portions 23 of the shrouds 20 to move into contact with the belts 24. This action, as well as the outward bulging of the belts 24 upon the slackening thereof, tends to urge the belts 24 forwardly upon slackening and thus out of engagement with the rotatable sheaves 10. The shrouds 20 could be fixed but the movable mounting described is preferred.

The foregoing description discloses the manner in which the present invention may be applied to a particular vehicle. It is to be understood that the invention is applicable not only to other types of vehicles, but also in other relations wherever it is desired to brake a rotating part.

With the brake design herein described, repeated application of the brake results in a creeping action of the belts 24 around the sheaves 10 and 11 which has the obvious advantage of distributing wear throughout the entire length.

It is anticipated that means for tightening and slackening the belts 24 other than by varying the distance between the centers of the sheaves 10 and 11 will readily occur to those skilled in the art. Furthermore, the designation of the member 11 as a sheave is intended to include any grooved arcuate member over which the belt runs and contacts. Moreover, I do not wish to be limited to a grooved brake band portion or any particular shape endless brake band.

Having thus described my invention, what I desire to secure by Letters Patent and claim is:

1. A brake mechanism comprising a rotatable member to be braked having a brake band portion, a brake element in the form of an endless flexible band, a nonrotatable part having a brake band portion, said endless band running over said portions and being free to creep and present new surfaces to the rotated member while in service, and means for tightening and slackening said band upon said portions to brake and release said rotatable member.

2. A brake mechanism comprising a rotatable member to be braked having a circular brake band portion, a brake element in the form of an endless flexible band, a nonrotatable part having a brake band portion, said endless band running over said portions and being free to creep and present new surfaces to the rotated member while in service, and means for tightening and slackening said band upon said portions to brake and release said rotatable member.

3. A brake mechanism comprising a rotatable member to be braked having a circular brake drum portion, a brake element in the form of an endless band, a nonrotatable part having an arcuate brake band portion, said endless band running over said portions and being free to creep and present new surfaces to the rotated member while in service, and means for tightening and slackening said band upon said portions to brake and release said rotatable member.

4. A brake mechanism comprising a rotatable member to be braked having a circular brake band portion, a brake element in the form of a free, endless flexible band, a nonrotatable part having an arcuate brake band portion, said endless band running over said portions, and means for tightening and slackening said band upon said portions, said band having a tendency to creep to present different portions thereof to said rotatable brake band portion.

5. A brake mechanism as defined in claim 1 wherein said endless band is in the form of a V belt, and said brake band portions of a complementary V shape groove to receive said V belt.

6. A brake mechanism comprising a rotary member having a brake band portion, a nonrotatable member having a brake band portion, an endless brake band running over said portions in the form of an elongated loop, said band having a tendency upon slackening to assume a more circular form, means mounting one of said members for movement relative to the other to tighten and slacken said band, and means for confining the movement of said band upon slackening to project the same out of braking relation with at least one of said brake band portions.

7. A brake mechanism having a grooved brake band portion, a nonrotatable member having a grooved brake band portion, an endless brake band running in said grooved portions in the form of an elongated loop, said band having a tendency upon slackening to assume a more circular form, means mounting one of said members for movement relative to the other to tighten and slacken said band, said band upon tightening gripping said grooved portions to brake said rotary member, and means for confining the movement of said brake band upon slackening to project the same out of braking contact with at least one of said grooved brake band portions.

8. A brake mechanism for a rotary member comprising a sheave fixed to said member to rotate therewith, the rotary axis of said member and that of said sheave being in alignment, a nonrotatable sheave, an endless belt passing about said sheaves, said belt and sheaves being arranged so that when said belt is placed under tension said sheaves grip said belt, and means to move said nonrotatable sheave to tension said belt to brake said rotary member.

9. A brake mechanism for a rotary member comprising a sheave fixed to said member to rotate therewith, the rotary axis of said member and that of said sheave being in alignment, a nonrotatable sheave, an endless belt passing about said sheaves, said belt having a V cross section and said sheaves having V belt grooves for operative co-operation with said belt, and means to move said nonrotatable sheave to tension said belt to brake said rotary member by wedging said belt into the sheave grooves.

10. The invention as defined in claim 8 wherein the belt is stiff and has a tendency to bow outwardly when slack and there is means for restraining outward bowing of the belt when the same is slack and at the same time for causing said belt to substantially free itself from at least one of said sheaves.

11. The invention as defined in claim 9 wherein the belt is stiff and has a tendency to bow outwardly when slack and there is means for restraining outward bowing of the belt when the same is slack and at the same time for causing said belt to substantially free itself from at least one of said sheaves.

12. In a brake, a pair of relatively movable sheaves, one of which is fixed against rotation, a belt passing over said sheaves in driving relation therewith, said belt having a tendency to bow outwardly when slack, a pair of controlling members for said belt, said controlling members being contiguous with the outside portions of said belt between said sheaves, said controlling members restraining outward bulging of said belt when slack and at the same time causing said belt to free itself from braking relation with at least one of said sheaves.

13. In a brake, a pair of relatively movable sheaves, one of which is fixed against rotation, a belt passing over said sheaves in driving relation therewith, said belt having a tendency to bow outwardly when slack, a pair of controlling members for said belt, said controlling members being parallel with the outside portions of said belt between said sheaves, said controlling means being arranged to be out of contact with but close to said outside portions of said belt when said belt is tight, and means to move one of said sheaves with respect to the other, said controlling members restraining outward bowing of said belt when slack and at the same time causing said belt to free itself from braking relation with said sheaves.

14. A brake mechanism for a rotary member, comprising a sheave fixed to said member to rotate therewith, the rotary axis of said member and that of said sheave being in alignment, a nonrotatable sheave, an endless belt passing about said sheaves, said belt having a tendency to bow outwardly when slack, said belt and sheaves being arranged so that when said belt is placed under tension said sheaves grip said belt, a member supporting said nonrotatable sheave, means to move said member to move said nonrotatable sheave to tension said belt to brake said rotary member and to slacken said belt to release the braking of said rotary member, and means for restraining outward bowing movement of said belt when the same is slack and at the same time causing said belt to free itself from braking relation with at least one of said sheaves.

15. A brake mechanism for a rotary member comprising a sheave fixed to said member to rotate therewith, the rotary axis of said member and that of said sheave being in alignment, a nonrotatable sheave, an endless belt passing about said sheaves, said belt being stiff and having a tendency to bow outwardly when slack, said belt and sheaves being arranged so that when said belt is placed under tension said sheaves grip said belt, a member supporting said nonrotatable sheave, means to move said member to move said nonrotatable sheave to tension said belt to brake said rotary member and to slacken said belt to release the braking of said rotary member, and means movable by said member for restraining outward bowing of the belt when the same is slack and at the same time causing said belt to substantially free itself from at least one of said sheaves.

16. In combination, a frame, a wheel supported from said frame for rotation, a brake drum associated with said wheel and rotatable therewith as a unit, said drum being located between said wheel and frame, an arcuate nonrotatable brake member supported from said frame and spaced in alignment with said drum, an endless brake band running over said drum and arcuate member, and means for varying the spacing of said drum and arcuate member to tighten said band to brake said wheel.

TRUMAN B. FUNK.